United States Patent [19]
Smith et al.

[11] 3,840,216
[45] Oct. 8, 1974

[54] VACUUM AERATION OF LIQUID WASTE EFFLUENT

[75] Inventors: James A. Smith, Westchester, N.Y.;
Robert G. Kaiser, Bergen, N.J.;
Bruce S. Moffatt, Westchester, N.Y.

[73] Assignee: Clark & Vicario Corporation, North Tarrytown, N.Y.

[22] Filed: Oct. 26, 1972

[21] Appl. No.: 301,117

[52] U.S. Cl. ................. 261/29, 210/14, 210/63, 210/196, 210/242, 261/120, 261/121 R, 261/DIG. 75
[51] Int. Cl. .............................................. B01f 3/04
[58] Field of Search .......... 55/189, 338; 210/14, 15, 210/63, 169, 194, 198, 196, 199, 242, 258, 294, 539; 261/29, 76, DIG. 75, 36 R, 121 R, 120; 417/108, 109

[56] References Cited
UNITED STATES PATENTS

| | | | |
|---|---|---|---|
| 827,341 | 7/1906 | Young et al. | 417/108 |
| 1,741,571 | 12/1929 | Ives | 417/108 |
| 1,790,975 | 2/1931 | Dallas et al. | 210/194 X |
| 2,102,042 | 12/1937 | Spence | 261/76 X |
| 2,638,444 | 5/1953 | Kappe | 210/194 |
| 2,770,365 | 11/1956 | Welsch | 210/15 X |
| 2,795,288 | 6/1957 | Hirs | 261/29 X |
| 3,289,609 | 12/1966 | Palo | 417/108 X |
| 3,444,076 | 5/1969 | Sekikawa et al. | 210/199 X |
| 3,483,985 | 12/1969 | Axelrod | 210/169 |
| 3,662,890 | 5/1972 | Grimshaw | 210/15 X |
| 3,669,422 | 6/1972 | Nogaj | 210/242 X |

FOREIGN PATENTS OR APPLICATIONS

| | | | |
|---|---|---|---|
| 95,365 | 7/1922 | Switzerland | 261/DIG. 75 |
| 236,892 | 11/1964 | Austria | 261/DIG. 75 |

*Primary Examiner*—John Adee
*Assistant Examiner*—Robert H. Spitzev
*Attorney, Agent, or Firm*—Watson Leavenworth Kelton & Taggart

[57] ABSTRACT

The transfer of dissolved oxygen to liquid waste effluent is enhanced by drawing the liquid waste in a closed flow course from a source thereof through a chamber subjected to low vacuum by means of which the effluent is suction lifted from the source to the chamber. Concurrently, atmospheric air is admitted to the flow course to entrain the air in the effluent and effect dissolving of at least some of the oxygen therein in the effluent. The condition of vacuum in the chamber removes a certain portion of the entrained air from the effluent delivered thereto, with at least a part of such removed air being reintroduced to the flow course at inlet thereto, the effluent which has been delivered to the chamber and which has a substantial quantity of air entrained therein being returned from said chamber to the source of effluent.

23 Claims, 7 Drawing Figures

VACUUM AERATION OF LIQUID WASTE EFFLUENT

BACKGROUND OF THE INVENTION

The present invention relates to improvements in the aeration of organic or inorganic liquid waste effluent involving the transfer of oxygen to the waste by the employment of vacuum producing means both to circulate the waste continuously and to continuously add an oxygen source, i.e., atmospheric air to the effluent.

In modern waste treatment plants it is well known that the transfer of oxygen to liquid wastes is a necessary function in order to reduce the bio-oxygen demand and chemical oxygen demand by stimulating growth of aerobic bacteria as well as to increase the total amount of dissolved oxygen in the liquid prior to further treatment or discharge into a receiving stream, reservoir or river. The oxygen may be added in the secondary waste treatment stage after the effluent leaves the primary clarifier, and preceeding the entry of same to the secondary clarifier or may alternately be added in an extended aeration treatment in a stabilized aeration basin in the form of a large pond or lagoon prior to discharge directly into the receiving river or stream. The necessity for adding oxygen is well known to be beneficial in secondary waste treatment and various means have been employed in the art to that end.

A common known manner of introducing oxygen to liquid waste is adding air under pressure to the liquid waste below the surface of aeration pond or reservoir through distributing pipes or orifices with the air bubbling from the submerged orifice up to the top of the water surface. Oxygen is transferred by the continuous mixing of the air bubbles with the water as the air bubbles are lifted by displacement and gravity forces up to the liquid surface. Certain treatment apparatus used in the foregoing manner, i.e., diffused air distribution employ submerged rotors or impellers which continuously agitate the bubbles and divide large bubbles into smaller ones for more efficient mixing due to greater bubble surface area and hence better oxygen transfer.

Additionally oxygen can be transferred in aeration basins by means of mechanical surface aerators consisting of rotors or impellers with blades or vanes mounted on a vertical shaft and located partially submerged at the top liquid surface of the pond or basin. Such aerators rely on the mixing action created by continuously circulating the liquid waste and discharging it a short distance above the level of the pond in the form of a coarse or fine spray thereby creating small liquid droplets which absorb oxygen from the atmospheric air.

Other known means for effecting oxygen transfer involve pumping the liquid effluent under pressure from the pond and discharging it in the atmosphere in the form of a spray of small droplets which absorb oxygen as the spray is discharged either to the ground or to the pond. Still others involve addition of pure oxygen under pressure directly to the liquid effluent and distributing it by means of orifices, revolving agitators or rotors, or by means of submerged distribution tubes.

The various aeration methods and apparatus referred to above all have certain limitations in respect of the total volume of liquid effluent circulated and the efficiency of oxygen transfer in terms of pounds of oxygen transferred per H.P. or kilowatt hour of energy required. In addition to these limitations known aeration devices, such as diffused air systems, require extensive manifold and distribution headers for carrying air from a centrally located air compressor or blower to the diffusers, involving high capital costs. In addition, maintenance costs of such systems are high due to the frequent plugging of orifices and/or distribution pipes. Plugging occurs frequently because of the presence of a large quantity of nondissolved solids in the effluent. This is especially the case in large aeration lagoons which can function as both oxidation ponds and storage basins for the effluent during different times of the year.

Mechanical surface aerators also involve relatively high maintenance costs due to the requirement for an expensive reduction gear in order to drive large diameter rotors at low speeds. Such reduction gears require frequent maintenance which is complicated by the fact that the aerators are located out-of-doors in ponds or lagoons and relatively inaccessible for easy replacement or repairs. The mixing effect of surface aerators also is limited to the area of the aeration basin immediately surrounding the aerator with the induced flow being in a circular direction around the aerator in a horizontal plane. The effluent discharged from the aerator blades or fins is thrown into the atmosphere and discharged upon the surface of the aeration basin so that oxygen transfer as the effluent passes through the air of the atmosphere is effected mainly to the effluent at or near the top of the liquid surface. The entrained air bubbles do not penetrate the surface of the pond as they are lighter than water. The circulation through the surface aerator is from the bottom of the pond up to the surface which induces relatively high velocities at the bottom of the basin immediately below the aerator but relatively low velocities at bottom locations which are removed only short distances from the aerator vertical axis. In addition, the entrainment of atmospheric air from the surface aerator results in the generation of considerable foam on the surface. Such foam is undesirable in that it produces flotation of certain suspended solids to the surface which in turn in undesirable when the effluent is passed to the succeeding stage of treatment involving secondary clarification since the secondary clarifier efficiency is reduced by the presence of entrained air in the effluent, prolonging the settling time of the suspended solids in the secondary clarifier.

In addition, the circulation of effluent flow from the bottom of the basin to the surface in a mechanical surface aerator may result in the discharge of obnoxious gases normally generated in the effluent at the bottom of the basin. Such gases, e.g., hydrogen sulphide or methane, not only result in atmospheric pollution but also present undesirable odors in the immediate vicinity of the aeration basin.

In diffusion type aeration systems, likewise, the flow of the effluent is in the direction from the bottom of the lagoon where the air is admitted up to the surface. The buoyant effect of the air displaces the water as the air bubbles move up to the surface. When the air bubbles are confined within a vertical tube, the water is moved ahead of the tube from the bottom up close to the top. The efficiency, however, of these devices is limited to the fact that the air bubbles have opportunity to contact the water only during the one pass upward from the bottom to the top. The air bubbles on the surface then remain in the form of foam and do no further useful work in so far as oxygen transfer is concerned. The quantity of effluent which can be continuously moved from the bottom to the top of the pond is likewise limited in diffusion air systems. As the bubble is subjected to the same hydrostatic pressure as the effluent at any liquid level, the vertical buoyant forces are necessarily limited depending on the depth of the aeration basin. This results in considerable velocity of the air bubbles but relatively low entrainment of effluent in basins of relatively low liquid depth.

Each of the problems just described is solved or ameliorated by the present invention as will appear from the description as follows.

SUMMARY OF THE INVENTION

The present invention is concerned generally with improvements in the operation of liquid waste effluent oxidation systems and specifically with means for providing continuous circulation of liquid effluent and air by means of a vacuum lift in which oxygen transfer to the liquid effluent is achieved by contacting the same with atmospheric air continuously in a number of passes.

It is a feature of the present invention that liquid effluent is continuously removed from the surface region of an aeration basin or lagoon and drawn by vacuum into a chamber, the top of which is located a distance above the level of the effluent in the basin. As the effluent is suction lifted in a flow course into the chamber by vacuum, atmospheric air is concurrently admitted to the flow course through orifices located above the level of the liquid surface of the pond, the pressure in the flow course being less than atmospheric pressure since it is under the influence of the vacuum in the chamber. Such air is admitted in the form of small bubbles which contact the effluent as it is moving upward into the vacuum chamber. The excess of air which is not absorbed or entrained in the effluent as it moves vertically upward is removed continuously by means of a vacuum pump, blower, ejector or like vacuum producing means. The certain portion of air removed and compressed by the vacuum producing means is then discharged at a level below the liquid surface of the pond continuously entraining liquid effluent which is in contact with the air below the pond surface, such discharge desirably being at the inlet to the suction flow course so that at least a part of the air removed in the vacuum chamber is reintroduced to the flow course.

The buoyant force of the air bubbles is enhanced by their expansion under the influence of vacuum from below the liquid surface up to the top of the vacuum chamber, thereby greatly accelerating the flow of effluent to the vacuum chamber. Oxygen is transferred to the effluent during the upward course of the air bubbles in contact with the liquid effluent below the surface.

The effluent is discharged or returned from the vacuum chamber to the effluent pond, without resort to use of pumps or control valves, continuously and at any desired depth below the liquid surface. The continuous circulation of effluent through the vacuum aerator is provided by the difference in overall density between the aerated liquid moving up to the vacuum chamber through the suction flow course on the inlet side as verses the density of the aerated liquid moving downward from the vacuum chamber through a separate flow course into the pond. The vacuum applied, i.e., the condition of vacuum in the chamber thereby produces both the suction lift necessary to continuously lift the effluent into the vacuum chamber as well as the source of air under vacuum and pressure to accelerate the effluent vertically upwards from below the surface. In this manner effluent flow is in effect from the surface of the basin or pond downward to the point of discharge which can be very close to the bottom of the pond rather than vertically upward or horizontally as in known methods of effluent aeration systems. Since the aerated liquid discharged from the vacuum chamber at the bottom of the pond generally will contain some undissolved air bubbles, these bubbles have further opportunity to effect transfer of oxygen to the effluent as they move from the bottom of the pond up again to the pond liquid surface. There are accordingly a total of at least three passes of flow during which air bubbles are in close contact with the effluent as it moves from the surface of the pond up into the vacuum chamber and down to the bottom of the pond and then back to the surface again. By this means then, the total time for the air to be in contact with the effluent is greatly enhanced and accordingly the efficiency of oxygen transfer greatly improved.

In addition, the mixing effect of the vacuum type aerator is greatly improved over existing devices because of the positive circulation of effluent provided by the vacuum. The vacuum can be controlled very simply by means of an atmospheric bleed regulation valve which is set to maintain a certain maximum operating vacuum in the chamber. By this means the total lift can be maintained at the minimum vacuum required for efficient oxygen transfer thereby resulting in maximum flow of effluent for a given amount of energy input to the vacuum producing means. By circulating the effluent from the top of the pond to the bottom, foam generation is kept to a minimum. The surface of the pond is not continuously agitated in the form of waves otherwise present from the surface action of mechanical surface aerators.

The effluent flow to the vacuum chamber may be picked up at several points close to the liquid surface as required, and similarly, the effluent may be discharged close to the bottom of the pond at locations as desired. The distribution locations will depend upon the size of the aeration basin and the number of vacuum aeration chambers required. These chambers may vary in size from relatively small diameter vertical tubes to large diameter vertical towers. The vacuum producing means can be applied to one or more vacuum chambers simultaneously depending on the total volume of effluent to be handled versus the overall retention time of the effluent in the particular aeration basin or lagoon employed. Such retention times may vary from a few hours up to many days depending upon the type of waste treatment plant involved, that is whether it is a so-called stabilized or extended aeration process for BOD and suspended solids reduction, or whether it is primarily for the purpose of adding oxygen to provide a higher dissolved oxygen content in the effluent before it is discharged to a receiving stream.

It is a further feature of the present invention that the source of pumping of both effluent and air is provided by a vacuum producing means maintaining a zone of vacuum which is located above the liquid surface of the effluent and which itself is never in contact with the effluent. The vacuum producing means, such as pumps or blowers, can be operated at high speeds without expensive gear reducers and without the risk of mechanical failure associated with direct pumping of the effluent systems involving large diameter rotors, turbine wheels, or centrifugal pumps. It can also include sources of power other than electrical, such as processed steam, if available, discharging such steam through a steam ejector which then becomes the source of vacuum for both circulating the effluent and bleeding in atmospheric air. In such cases the steam discharged from the ejector is then condensed by the effluent which in installations involving low temperature winter operation will assist in promoting optimum operating temperatures in the aeration basin for bio-degradable bacteria growth.

It is a further feature of the present invention that the effluent returned to the bottom of the basin may be directed upward above the liquid surface of the pond and distributed in a free discharge horizontally at or above the pond surface in any direction as required to maintain requisite surface velocity gradients. By this means, surface bubbles are continuously broken by impingement of discharged effluent and formation of surface foam is minimized. Oxygen transfer is further enhanced by such impingement.

In addition the hydraulic head provided by the higher elevation may be used to discharge the effluent, if desired, to a succeeding system stage, e.g., secondary clarifier, without the necessity for additional pumping means.

BRIEF DESCRIPTION OF THE DRAWINGS

Other objects of the invention will in part be obvious and will in part appear from the following detailed description taken in conjunction with the accompanying drawing, wherein like reference numerals identify like parts throughout, and in which.

DESCRIPTION OF THE PREFERRED EMBODIMENTS

The present invention is concerned with improvements in the aeration of liquid waste effluent and especially the manner and means employed in such systems for providing improved oxygen transfer to the liquid effluent combined with maximum flow of effluent through the aeration apparatus in order to provide a highly efficient mixing of the entire aeration basin. The present invention has application both to organic and inorganic liquid waste effluent when employed both as part of an overall waste treatment involving primary, secondary, and tertiary treatment as well as independent aeration systems including extended aeration and stabilized systems such as utilized in oxidation ponds or lagoons.

Figure 1:
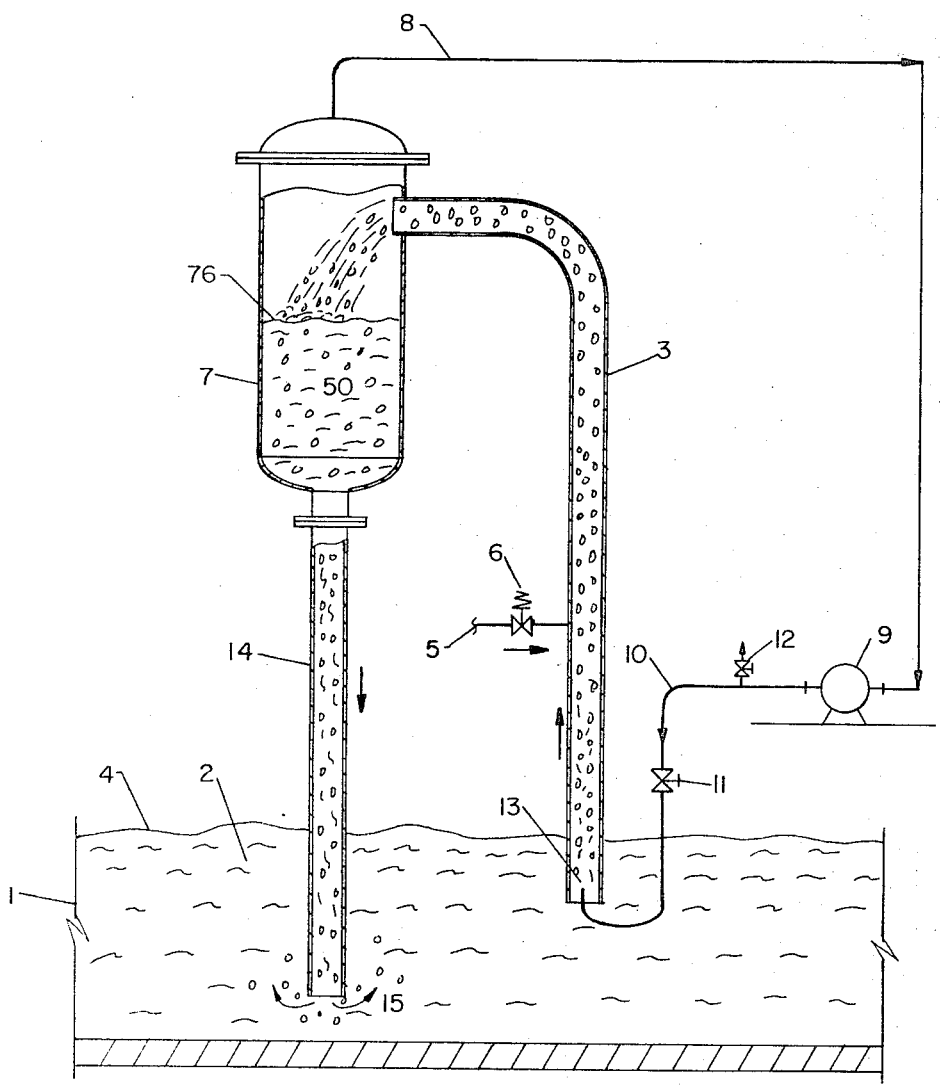
FIG. 1 is a schematic representation, with some parts in section and broken away, of improved vacuum aeration apparatus constructed in accordance with the principles of the present invention.

The system illustrated in FIG. 1 of the drawings includes a basin in the form of a tank, lagoon, or pond 1 containing an accumulation of liquid waste effluent 2. The liquid waste may have both organic or inorganic constituence with a high biooxygen demand (BOD) and chemical oxygen demand (COD) loading created by the presence of both dissolved and suspended solids. In order to reduce such loading and provide aerobic bacteria growth, dissolved oxygen is added to the effluent. Liquid effluent is continuously suction lifted through a conduit 3 the lower terminus, i.e., the inlet, of which is located just below or adjacent the top surface 4 of aeration basin 1, the suction lifting being effected by the condition of vacuum existing in receiver 7. Concurrently air from the atmosphere is admitted into the conduit 3 through a adjustable relief valve 6 located above the liquid surface 4 at a height sufficient to assure a rapid inward air bleed, the bleed occurring by reason of the reduced pressure in conduit 3. The air and effluent are intimately mixed and distributed uniformally through conduit 3 with the air being continuously expanded by virtue of the increasing vacuum as the mixture flows upward. The expansion of the air bubbles accelerates the liquid flow of effluent creating a high degree of turbulence up conduit 3 and into vacuum receiver 7 enhancing transfer of oxygen to the effluent. The mixture of air bubbles and liquid effluent are further expanded due to the increasing volume in receiver 7 resulting in still further enhancement of the rapid and efficient absorption of oxygen from the air into the effluent.

Excess air drawn into the system, i.e., air not entrained in the effluent is continuously removed through conduit 8 located at the top of receiver 7 which conduit extends to the vacuum producing means 9 such as mechanical vacuum pump, steam-air ejector unit or the like.

A feature of the present invention is that excess air removed in receiver 7 is recycled from the discharge side of vacuum producing means 9 through conduit 10 and control valve 11 to discharge through orifice 13 located in the entry to effluent inlet conduit 3 to thus return at least a part of the previously removed portion of air to the effluent. The air thus recycled combines with atmospheric air being continuously drawn in through line 5 and bleed valve 6. Another portion of the excess air is continuously discharged to the atmosphere through discharge relief valve 12 located on the discharge side of vacuum producing means 9 in conduit 10.

A pond or pool 50 of liquid effluent is continuously maintained in vacuum aeration receiver 7 with liquid level 76 of the pond being at an elevation corresponding to the hydraulic head maintained by vacuum pump 9. As the density of the liquid effluent in vacuum receiver 7 is greater than that in inlet conduit 3 effluent is continuously discharged by gravity through conduit 14 the lower terminus of which discharges in aeration basin 1 at 15, i.e., at the outlet located adjacent the bottom of the basin or pond.

Some air bubbles are continuously entrained in passage of the effluent downward through conduit 14 and thus additional oxygen is continuously transferred to the effluent as it flows down such conduit to the aeration basin. Because of the buoyant nature of the air bubbles further oxygen transfer is achieved as the bubbles move from the bottom of the basin up to the liquid surface 4.

From the foregoing it will be seen that oxygen accordingly is transferred to the liquid effluent in three stages (1) as the effluent moves up from the surface of the pond into the vacuum aeration receiver through conduit 3, (2) to the effluent as it moves downward from the receiver 7 to the bottom of the pond and (3) then again as the air bubbles move up through the liquid effluent to the top of the pond. By this means the total oxygen transfer with respect to time is greatly enhanced. By recirculating atmospheric air through the vacuum pump discharge continuously, there is a further increase in operating efficiency. Further, both the atmospheric air admitted through relief valve 6 and recirculated air discharged through orifice 13 enters the system at points where the effluent is already moving with considerable velocity and turbulence because of the induced vacuum. For this reason, there is no tendency to plug the air inlets to conduit 3. Furthermore, the expansive force of the air as it enters conduit 3 results in the formation of very small air bubbles with extensive surface area necessary for efficient oxygen absorption of same by the effluent.

A considerable volume of flow can be induced by the apparatus of FIG. 1 thereby creating a rapid turnover of liquid effluent in the aeration basin. This is essential towards efficient mixing of the contents to prevent the creation of pockets of low or zero velocity which can lead to zero DO or septic conditions. By discharging the aerated effluent at the bottom of the aeration basin, a considerable portion of the unabsorbed air bubbles contact directly the accumulated solids or sludge lying on the aeration basin bottom. In this way the formation of noxious and malodorous gases in the basin is inhibited.

Figure 2:
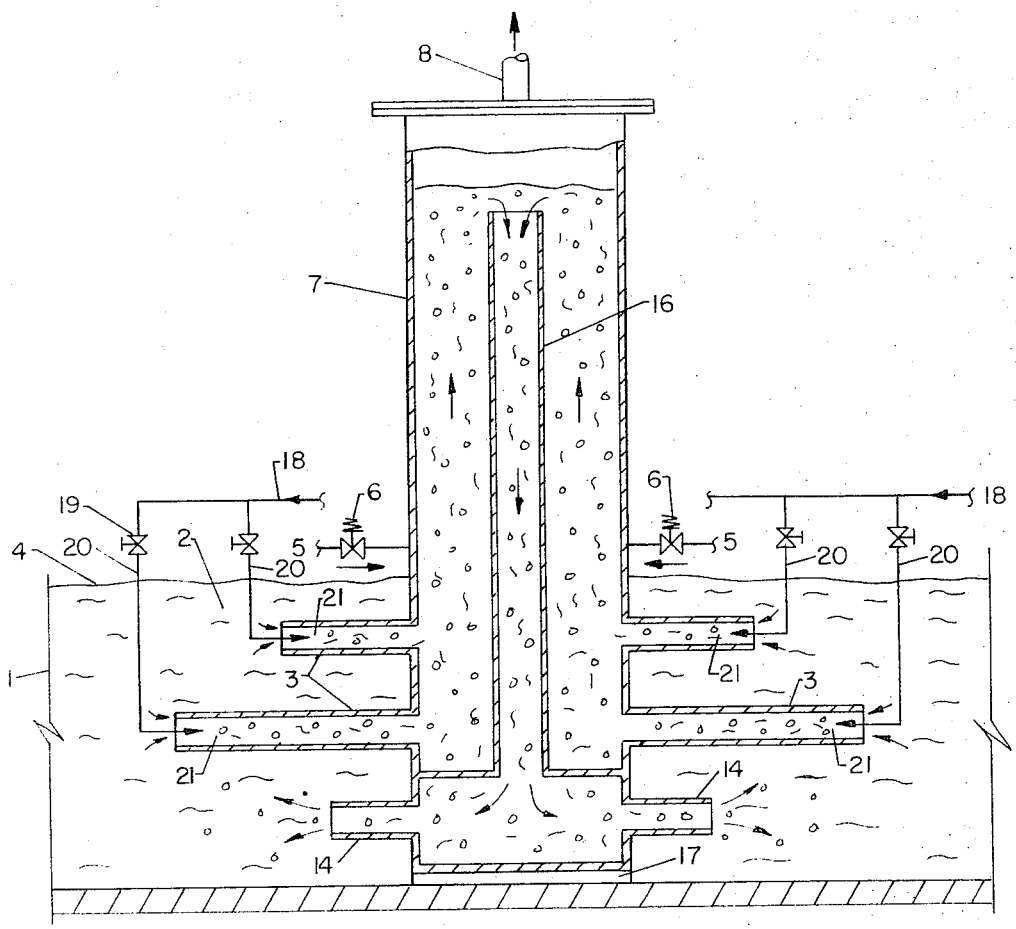
FIG. 2 is an elevational view in section to a larger scale of a vacuum aeration receiver located in a aeration basin, showing the manner in which plural inlet manifolds are located below the liquid surface through which the waste effluent is drawn into the vertical vacuum aerator receiver and showing a plurality of discharge manifolds outletting close to the bottom of the aeration basin through which the aerated effluent is continuously discharged, there further being depicted one manner in which the receiver can be supported in said basin.

FIG. 2 shows a further embodiment of apparatus according to the present invention. The vacuum aeration receiver 7 in the form of a closed vertical cylindrical tank is mounted on and supported by foundation 17 located at the bottom of the aeration basin 1. Typically, the basin may have a liquid depth of from 5 to 20 or more feet. Effluent is admitted to the apparatus through a plurality of inlet conduits 3 disposed radially around the circumference of vacuum aerator 7 at locations below the liquid surface 4 of the aeration basin 1. The length and positioning of the inlet conduits 3 can be adjusted to suit the particular configurations of the basin and the number of units installed which will depend upon the total volume, the retention time, and the surface area. Individual atmospheric air bleeds 5 and relief valves 6 are located also circumferentially above the liquid level in the pond for admitting air inward into the vertical receiver 7. The aerated effluent passes upward to the top of the aeration tower from where it is discharged by gravity downward through central discharge column 16 to the bottom of the tower from which the aerated effluent is discharged outward through radially arranged conduits 14 into the aeration basin.

The excess air not absorbed or entrained in the effluent during the vertical upward flow is continuously removed by means of a vacuum source such as a vacuum pump. Air discharged from the vacuum pump is then recirculated back into the inlet conduits 3 to further accelerate the flow of effluent in such conduits. Equal proportions of recirculated air are admitted from recirculation manifold 18 through the respective control valves 19 and conduits 20, the latter terminating in exit orifices 21.

Figure 7:
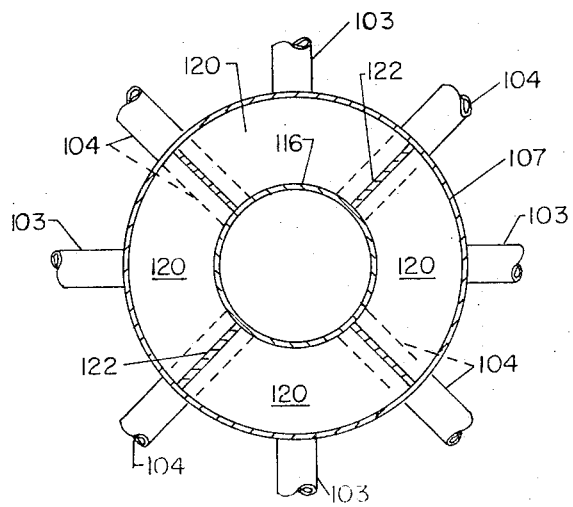
FIG. 7 is a horizontal sectional view of a further modified form of aeration apparatus similar in construction to that shown in FIG. 2.

FIG. 7 depicts apparatus generally similar to that shown in FIG. 2 in that the same includes a receiver shell 107 and a central discharge column or pipe 116 with the former being connected on submerged location with inlet conduits 103 and the latter with outlet conduits 104. Additionally the annular space 120 between the shell 107 and central pipe 116 is divided into a plurality of compartments by means of plates 122 so that each compartment is separated from the others and is associated with one of the inlet conduits 103. The advantage of providing the plates 122 to divide the space as described is to avoid the admitted air short circuiting along common paths to thereby impede optimum entrainment of the same in the effluent.

Individual vacuum aeration systems of the type as shown in FIGS. 1 and 2 can be combined in a multiplicity of receivers to fit the requirements of any particular aeration basin or pond. Typically, the throughput through an individual vacuum aerator can be of the order of 5,000 GPM effluent flow each, through a tower approximately 3 ft. in diameter. The total height for such a tower in an aeration basin 5 ft. deep would be approximately 10 to 15 feet total height. The flow may be varied by varying the liquid level within the receiver and this is controlled by regulating the quantity of inbleed air through bleed valves 6. Flow rates of 600 to 1,000 GPM per H.P. applied to the vacuum producing means can be induced thru such apparatus.

Figure 3:
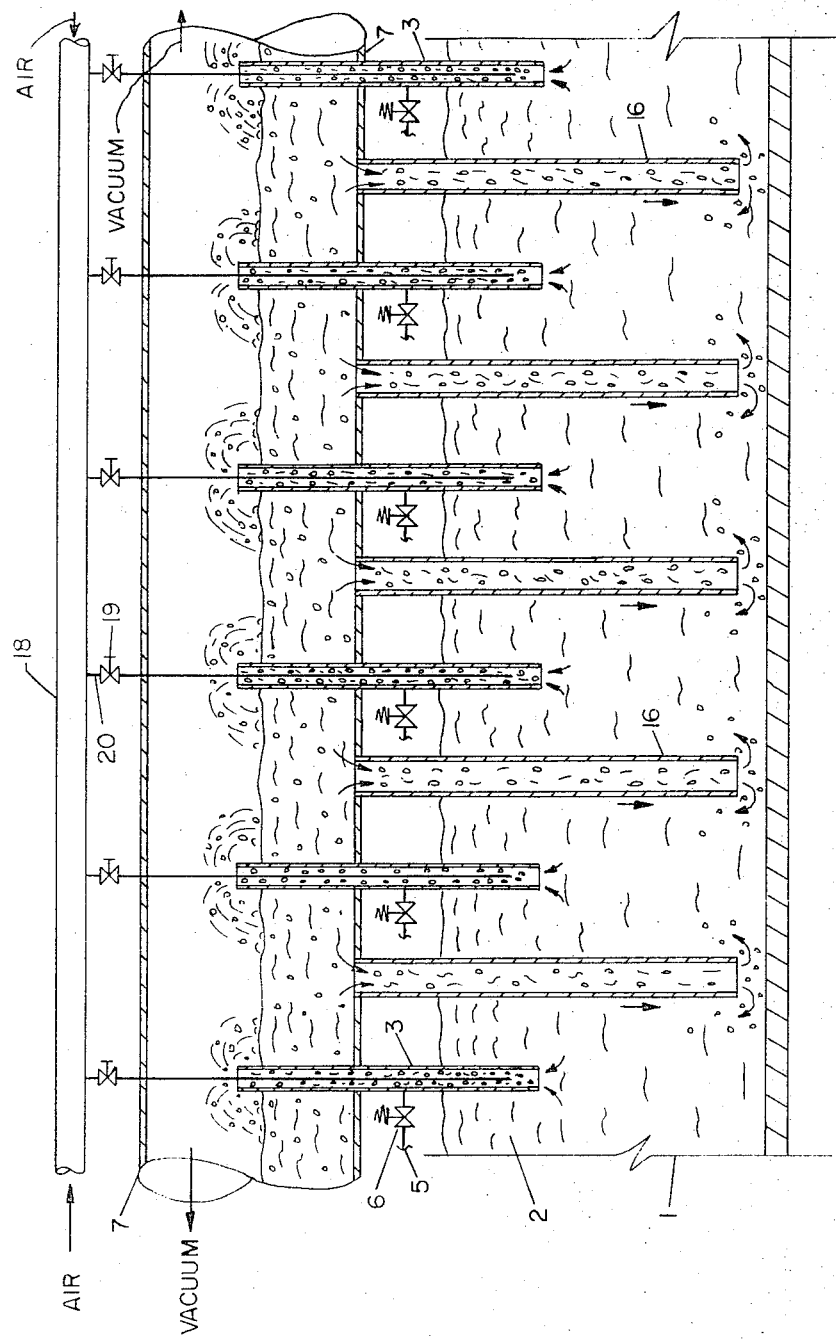
FIG. 3 is an elevational view in section of a modified form of vacuum aeration apparatus characterized by a horizontal longitudinal receiver maintained under vacuum into which is drawn waste effluent through manifolds the inlets to which are located close to the surface of the aeration basin and in which the discharge manifolds outlet close to the bottom of the aeration basin.

FIG. 3 is an alternative embodiment of the vacuum aeration receiver 7 consisting of an extended cylindrical longitudinal receiver mounted above or at the liquid level of the aeration basin and having a plurality of vertical pipe inlets 3 having inlet thereto adjacent the basin surface, and vertical pipe discharges 16 which outlet near the basin bottom as shown. Such receivers may extend horizontally across the entire aeration basin from side to side. Typical flow rates thru such receivers might be from 100,000 gallons per minute up to 200,000 gallons per minute depending upon basin widths, total retention time, and total effluent flow to be handled.

Figure 4:
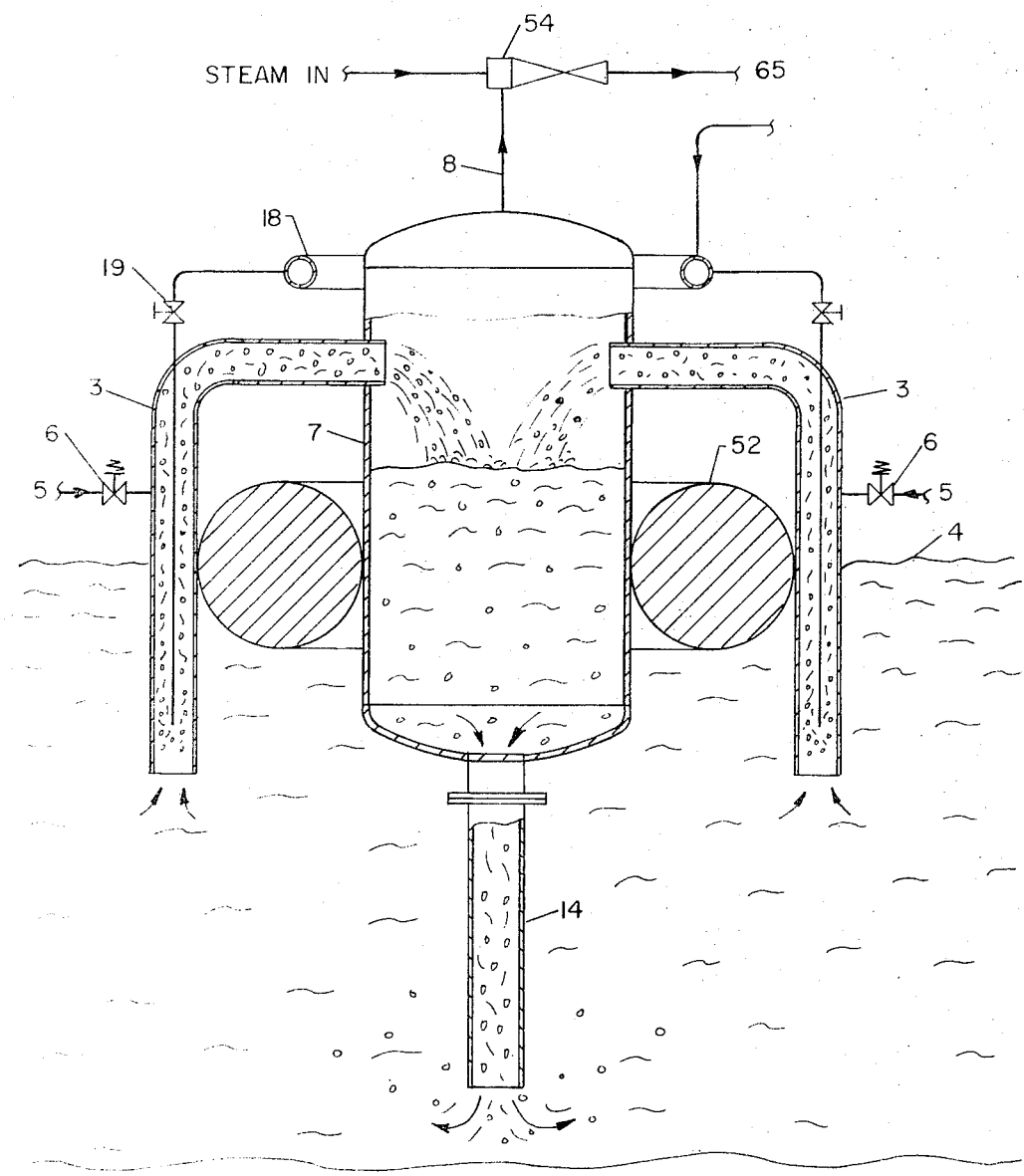
FIG. 4 is a fragmentary sectional view of a further form of vacuum aeration receiver mounted on a buoyancy float attached to and supporting the vacuum aeration receiver in a floating condition and further depicting use of a steam air ejector as the vacuum producing means.

FIG. 4 is an alternative embodiment of the vertical vacuum aerator illustrated in FIG. 2 in which the receiver 7 is floatingly supported on the surface of the aeration basin by means of a buoyancy float ring 52. This arrangement is particularly advantageous for use in aeration lagoons whose liquid level may be subject to seasonal fluctuation. Additionally, such apparatus can employ a steam operated air ejector unit 54 as a vacuum producing means, with the steam condensator being exhausted with ejected air to the basin by way of return conduit 65.

Figure 5:
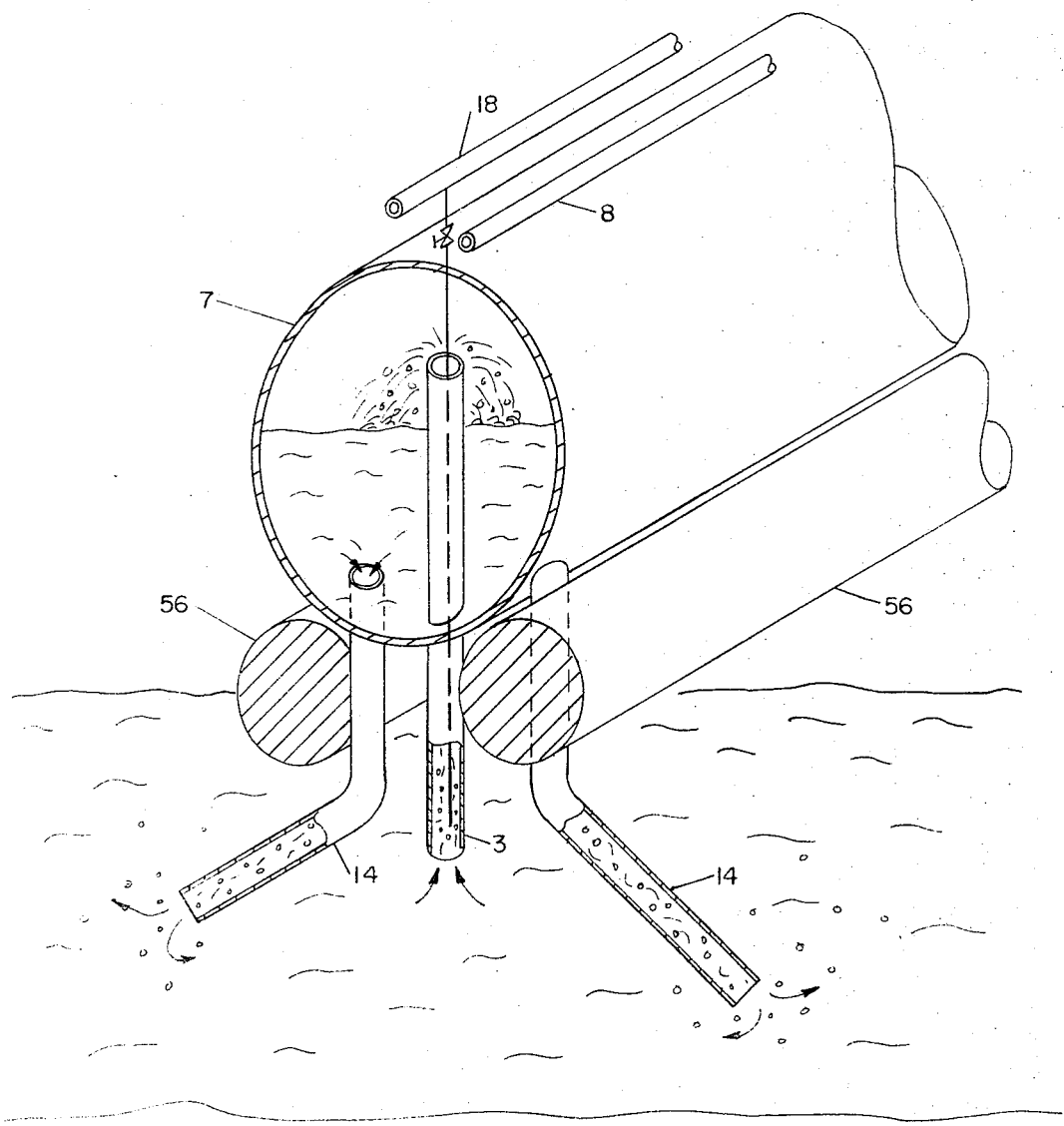
FIG. 5 is a fragmentary sectional view of the apparatus shown in FIG. 3 modified to include flotation means.

FIG. 5 is a further alternative embodiment of the apparatus illustrated in FIG. 3 in which the longitudinal cylindrical receiver 7 disposed in a horizontal position is supported by means of buoyancy floats 56 throughout the length thereof, the output pipes 14 being angularly offset in respect of the receiver axis to facilitate distribution over a wide expanse of the basin.

Figure 6:
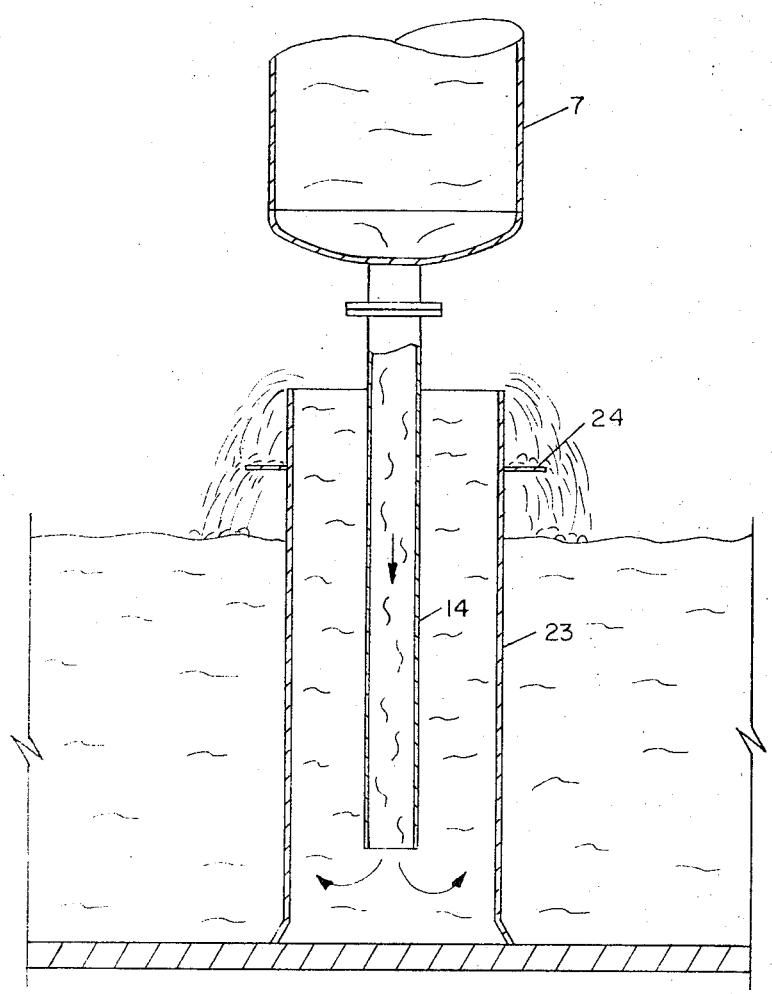
FIG. 6 is an elevational view of the apparatus shown in FIG. 1 modified to include conduit means for returning the flow of effluent discharged at the bottom of the aeration basin to above the basin surface in free discharge onto splash trays located at the pond surface for directing the flow horizontally outwards.

In certain aeration basins it may be desirable to restrict the flow of effluent discharged from the return conduits close to the bottom of the basin and to return the flow upward above the liquid level of the pond. FIG. 6 is an embodiment of apparatus provided to discharge the effluent in this manner. A cylindrical conduit 23 open at the top and closed at the bottom surrounds and is concentric with discharge conduit 14 as shown in FIG. 6, such conduit 23 defining a collection zone in the pond separated from the remainder of the pond. The effluent discharged from receiver 7 flows up on the annular space between conduit 14 and 23 and is discharged in free discharge above the liquid level of the pond. The overflow effluent at the top of conduit 23 falls downward onto splash trays 24 which serve as diversion barriers and direct the effluent horizontally outward across the surface of the pond. In this manner the effluent discharge flows radially outward from the vertical line of the aerator in such a manner as to restrict the formation of surface foam and provide the desirable circulation at the top of the pond surface. Oxygen transfer is thereby enhanced by further absorption of oxygen from the atmospheric air as the effluent falls down in free discharge onto and is directed outwardly radially from splash trays 24. Because of the additional lift required from the surface of the aeration pond to the top of conduit 23 some reduction of flow occurs which is offset by the additional oxygen transfer achieved. The top of conduit 23 may be from a few inches up to several feet above the surface of the pond.

While all of the components depicted in the apparatus of FIGS. 2–6 are not described in detail, it will be understood that the inlet and outlet conduits, air intake lines, control valves etc. shown in the apparatus of FIG. 1 are also used in the FIGS. 2–6 embodiments.

While there is disclosed only certain embodiments of the aeration apparatus and method of the present invention it is possible to produce still other embodiments without departing from the scope of the inventive concept herein disclosed and accordingly, it should be understood that all matter contained in the above description and in the accompanying drawings should be interpreted as illustratve and not in a limited sense.

What is claimed is:

1. A method for effecting transfer of oxygen from atmospheric air to liquid waste effluent which comprises
continuously drawing effluent through an unobstructed closed flow course having entry thereto in a source of said effluent and outlet therefrom in an enclosed zone of vacuum located a distance above said source while concurrently admitting atmospheric air flow to said flow course thereby to entrain such air in said effluent and dissolve at least some of the oxygen in said entrained air in said effluent,
said zone being maintained under a continuous condition of vacuum sufficient to effect suction lifting of said effluent from said source to said zone and further to remove a certain portion of entrained air from the effluent delivered to said zone whereby there is provided a greater density in the effluent in said zone than that of the effluent flowing in said flow course,
reintroducing at least a part of the certain portion of the air removed in said zone to the effluent in said source at a location below the surface of the latter, and
continuously returning effluent by force of gravity from said zone of vacuum to said source.

2. The method of claim 1 wherein said source is a filled basin of liquid waste effluent, the entry to said flow course being within said basin adjacent the surface thereof, the effluent being returned from said zone of vacuum to said basin in a separate closed flow course outletting adjacent the bottom of said pond.

3. The method of claim 2 wherein said zone is maintained under vacuum by ejecting air therefrom with a jet of steam, said steam being exhausted with ejected air and returned to said basin.

4. The method of claim 1 wherein said source is a filled basin of liquid waste effluent, the effluent being returned from said zone in a free discharge to the surface of said basin from an elevation a distance above said surface.

5. The method of claim 4 wherein the return flow of effluent to said basin is directed from said zone of vacuum to submerged outlet in a confined collection zone in said basin separated from the remainder of said basin, said collection zone having an overflow level spaced a distance above the level of said remainder of said basin from whence said free discharge issues.

6. The method of claim 5 wherein the free discharge from said overflow level is directed against a diversion barrier at the surface of said basin to effect horizontal cascade of said discharge onto said surface.

7. The method of claim 1 wherein said source is a pond of liquid waste effluent, the effluent being drawn from said basin from a plurality of locations therein, the effluent being returned from said zone to said basin in plural separate closed flow courses.

8. The method of claim 1 in which said portion of removed air is returned to said source at the inlet to said flow course.

9. Apparatus for effecting transfer of oxygen from atmospheric air to a liquid waste effluent within a basin, said apparatus comprising
an enclosed receiver,
means supporting said receiver with at least an upper portion thereof extending a distance above the level of effluent in said basin, first conduit means interconnecting said upper portion of said receiver and the effluent in said basin, means for maintaining a continuous condition of vacuum in said receiver sufficient to suction lift effluent from said basin through said first conduit means to said receiver, means for admitting air from the atmosphere to said first conduit means, said condition of vacuum further being sufficient to remove a portion of the air from the effluent in said receiver whereby the effluent in said receiver has a greater density than that flowing in said first conduit means, means for returning at least a portion of the air removed in said receiver to said basin at a location below the level of the effluent therein, and second conduit means interconnecting a lower portion of said receiver and the effluent in said basin for returning effluent by force of gravity from said receiver to said basin.

10. Apparatus according to claim 9 in which the means for returning at least a portion of the air removed in said receiver to said basin comprises a conduit extending between said receiver and the inlet of said first conduit means.

11. The apparatus according to claim 9 in which the inlet to said second conduit means is disposed in said basin adjacent the level of effluent therein.

12. The apparatus according to claim 9 in which said second conduit means outlets in said basin adjacent the bottom thereto.

13. The apparatus according to claim 9 in which the vacuum maintaining means comprises a vacuum pump.

14. The apparatus of claim 9 in which the vacuum producing means comprises a steam operated air ejector.

15. The apparatus according to claim 9 in which the means for admitting air from the atmosphere to said first conduit means comprises a bleed valve connected to first said conduit means.

16. The apparatus according to claim 9 in which the means for supporting said receiver in said basin comprises structure disposed at the bottom of said basin.

17. The apparatus according to claim 9 in which the means for supporting said receiver in said basin comprises a flotation member connected with said receiver and floating on the surface of the effluent in said basin.

18. The apparatus according to claim 9 in which said first conduit means include a plurality of inlet connections thereto, said inlet connections being disposed at correspondingly plural locations in said basin.

19. The apparatus according to claim 9 in which said second conduit means comprises a plurality of separate conduits outletting at correspondingly plural locations in said basin.

20. The apparatus according to claim 9 in which said second conduit means comprises a pipe extending downwardly in said basin and having outlet adjacent the bottom of said basin, said apparatus further comprising a larger cylindrical conduit encircling said second conduit means and extending to the bottom of said basin to define a separate collection zone into which the effluent outletting from the said second conduit means flows, said cylindrical conduit extending a distance above the surface of the effluent in said basin and having an upper overflow edge from whence issues a free discharge of effluent.

21. The apparatus according to claim 20 further comprising at least one splash plate encircling said cylindrical conduit and extending radially therefrom adjacent the surface of the effluent in said basin for diverting free discharge flow across the surface of the effluent in said basin.

22. The apparatus according to claim 9 in which said receiver is a cylinder having its major axis disposed vertically, said cylinder extending downwardly below the surface of the effluent in said basin, said first conduit means including a plurality of pipes communicating with said cylinder, said second conduit means comprising a pipe extending axially within said receiver from a location at one end adjacent the top of the latter to a location at the other end adjacent the bottom of said basin, said cylinder and said pipe defining therebetween an annular intake flow space for said waste effluent.

23. The apparatus according to claim 22 in which the annular space between said cylinder and said pipe is provided with a plurality of radially arranged plates extending in the axial direction of said cylinder, and being coextensive therewith and dividing said space into a corresponding plurality of separate compartments, said first conduit means comprising a like plurality of inlet pipes, each inlet pipe being associated with each of one of said separate spaces.

* * * * *